United States Patent [19]
Nashimoto et al.

[11] Patent Number: 5,790,167
[45] Date of Patent: Aug. 4, 1998

[54] OPTICAL SCANNING DEVICE, OPTICAL SCANNING METHOD, AND IMAGE FORMING APPARATUS USING THE SAME

[75] Inventors: Keiichi Nashimoto, Minami Ashigara; Masao Ito, Ebina, both of Japan

[73] Assignee: Fuji Xerox Co., Ltd., Tokyo, Japan

[21] Appl. No.: 654,977

[22] Filed: May 28, 1996

[30] Foreign Application Priority Data

May 29, 1995 [JP] Japan ................... 7-152742

[51] Int. Cl.$^6$ ........................... B02F 1/11
[52] U.S. Cl. ........................ 347/259; 359/287
[58] Field of Search .................. 347/259, 260, 347/243; 359/237, 285, 287

[56] References Cited

U.S. PATENT DOCUMENTS

| | | | |
|---|---|---|---|
| 3,703,137 | 11/1972 | Anderson et al. | 396/561 |
| 4,425,023 | 1/1984 | Matsumoto et al. | 350/96.14 |
| 4,912,487 | 3/1990 | Porter et al. | 346/108 |
| 4,925,261 | 5/1990 | Byckling et al. | 350/371 |
| 5,039,855 | 8/1991 | Kemeny et al. | 250/339 |
| 5,138,478 | 8/1992 | Ogawa | 359/204 |
| 5,532,730 | 7/1996 | Akanabe | 347/259 |
| 5,633,747 | 5/1997 | Nikoonanhad | 359/312 |
| 5,641,954 | 6/1997 | Keefer et al. | 250/227.12 |

FOREIGN PATENT DOCUMENTS 52-68307  6/1977  Japan.
63-64765  12/1988  Japan.

OTHER PUBLICATIONS

Chen S. Tsai, *IEEE Trans. Circuits and Syst.*, "Guided–Wave Acoustooptic Bragg Modulators for Wide–Band Integrated Optic Communications and Signal Processing", vol. CAS–26 No. 12, (1979), pp. 1072–1098.
Nobuharu Nozaki et al., *Technical Report of The Institute of Electronics, Information and Communication Engineers*, "Integrated Acoustooptic Printer Head", OQE85–177, (1986), pp. 43–48.
Masami Hatori et al., *Technical Report of The Institute of Electronics, Information and Communication Engineers*, "A Waveguide–Type Acousto–Optic Wide–Angle Deflector", OQE88–139, (1989), pp. 9–15.

*Primary Examiner*—Peter S. Wong
*Assistant Examiner*—Gregory J. Toatley, Jr.
*Attorney, Agent, or Firm*—Oliff & Berridge PLC

[57] ABSTRACT

An optical scanning device having a scanning speed which can be used in a laser beam printer, a digital copier, a facsimile apparatus or the like, an optical scanning method using the optical scanning device, and an image forming apparatus using the optical scanning device are disclosed. The optical scanning device comprising: a light source for emitting a laser beam having a constant divergent angle; a thin film waveguide; means for coupling the laser beam to said thin film waveguide; and a comb-like electrode for exciting a surface acoustic wave of a high frequency sweep signal so that the laser beam is deflected to be output as parallel rays.

12 Claims, 7 Drawing Sheets

OPTICAL SCANNING DEVICE, OPTICAL SCANNING METHOD, AND IMAGE FORMING APPARATUS USING THE SAME

FIELD OF THE INVENTION

The invention relates to an optical scanning device comprising: a thin film waveguide; a light source which emits a laser beam into the thin film waveguide; and an electrode which excites a surface acoustic wave for deflecting the laser beam in the thin film waveguide, an optical scanning, and an image forming apparatus using the device or the scanning.

BACKGROUND OF THE INVENTION

A typical laser beam optical scanning apparatus which is used in a laser beam printer, a digital copier, a facsimile apparatus or the like comprises a polygon mirror which deflects a beam from a gas laser or a semiconductor laser, and an fθ lens which focuses the laser beam reflected from the polygon mirror, in a state of a uniform linear motion on an image forming face of a photoreceptor or the like. In such an optical scanning apparatus using a polygon mirror, since the polygon mirror is rotated at a high speed by a motor, there arise problems of reduced durability and generation of noise, and a further problem in that the optical scanning speed is limited by the number of revolutions of the motor.

On the other hand, as a solid state laser beam optical deflecting apparatus, known are optical deflecting devices using the acoustooptic effect. Among such devices, an optical waveguide type device is promising (for example, C. S. Tsai, IEEE Trans. Circuits and Syst., vol. CAS-26(1979) 1072). As a laser beam optical scanning device which may solve the defects of a laser beam optical scanning apparatus using a polygon mirror, application of such an optical waveguide device to a printer or the like is studied as described in Nozaki et al., Technical Report of The Institute of Electronics, Information and Communication Engineers, OQE85-177(1986) 43; and Hatori, et al., Technical Report of The Institute of Electronics, Information and Communication Engineers, OQE88-139(1989) 9. As disclosed in JP-A-52-68307 (The term "JP-A" used herein means an "unexamined published Japanese patent application") and JP-B-63-64765 (The term "JP-B" used herein means an "examined Japanese patent publication"), such an optical deflecting device of the optical waveguide type comprises: an optical waveguide made of LiNbO_3 or ZnO; means for coupling a laser beam into the optical waveguide; a comb-like electrode for exciting a surface acoustic wave for deflecting the laser beam in the optical waveguide by means of the acoustooptic effect; and means for outputting the deflected laser beam from the optical waveguide. As required, the device may further comprise a thin film lens, etc. The optical deflecting device of the optical waveguide type has advantages of noiseless, high reliability and reduced size.

In deflection using the acoustooptic effect of such an optical deflecting device of the optical waveguide type, generally, a surface acoustic wave is excited by means of digital modulation. When this modulation system is employed in a laser beam printer, a digital copier, a facsimile apparatus or the like, problems arise because a laser beam scanning speed to a degree which is practically appropriate cannot be obtained. On the other hand, another modulation system is known, in which a surface acoustic wave is excited by means of analog modulation which operates at a higher speed than digital modulation. When this modulation system is employed, modulated laser light converges or diverges, thereby producing a problem in that, when this modulation system is employed in a laser beam printer, a digital copier, a facsimile apparatus or the like, a laser beam of a shape which is practically appropriate cannot be obtained.

In view of the state of the prior art, the invention has been conducted in order to improve the state.

SUMMARY OF THE INVENTION

Therefore, it is an object of the present invention to provide a laser optical scanning device which is an optical scanning device of the thin film waveguide type using the acoustooptic effect, in which the speed of optical deflection due to the acoustooptic effect is increased and a laser beam of a practically acceptable shape is obtained, and which can be therefore used in a laser beam printer, a digital copier, a facsimile apparatus or the like.

It is another object of the invention to provide an optical scanning method in which the optical scanning device is used.

It is a further object of the invention to provide an image forming apparatus in which the optical scanning device is used.

The above described object of the present invention has been achieved by providing:

(a) an optical scanning device comprising:

a light source for emitting a laser beam having a constant divergent angle;

a thin film waveguide;

means for coupling the laser beam to said thin film waveguide; and a comb-like electrode for exciting a surface acoustic wave of a high frequency sweep signal so that the laser beam is deflected to be output as parallel rays;

(b) an optical scanning method comprising the steps of:

coupling a laser beam having a constant divergent angle, which is emitted form a light source, into a thin film waveguide; and exciting a surface acoustic wave of a high-frequency sweep signal by a comb-like electrode so that the laser beam is deflected by analog modulation in which frequency continuously changes, thereby outputting the laser beam as parallel rays to be used in a scanning operation; and (c) an image forming apparatus comprising:

a photoreceptor;

charging means for uniformly charging said photoreceptor;

exposing means for irradiating said photoreceptor with light to form a latent image; and developing means for visualizing the latent image, wherein said exposing means is an optical scanning device comprising: a light source for emitting a laser beam having a constant divergent angle; a thin film waveguide; means for coupling said laser beam to said thin film waveguide; and a comb-like electrode for exciting a surface acoustic wave of a high-frequency sweep signal so that the laser beam is deflected to be output as parallel rays.

The above and other objects and features of the present invention will be more apparent from the following description taken in conjunction with the accompanying drawing.

DETAILED DESCRIPTION OF THE INVENTION

The invention will be described in detail below.

The optical scanning device of the invention comprises a light source such as one or plural lasers which emit one or plural laser beams to a thin film waveguide, or a laser array which oscillates plural laser beams, and coupling means. In the thin film waveguide, as required, a thin film lens which shapes the laser beams is disposed. The laser beams entering from the light source into the thin film waveguide are set to have a constant divergent angle which is larger than 0° and smaller than 20°, preferably larger than 0° and smaller than 10°. The optical scanning device further comprises a comb-like electrode for exciting a surface acoustic wave (SAN) for deflecting the laser beams having the constant divergent angle by means of analog modulation in which a frequency sweep control is conducted and the frequency is continuously changed. The optical scanning device has a construction in which emitting means for emitting the deflected laser beams to the outside of the thin film waveguide, such as end face emission, a grating or a prism is disposed. Preferably, the analog modulation is controlled in accordance with a frequency sweep signal which satisfies the condition of expression [28] described below and which has a waveform such as shown in FIG. 4.

In the invention, typical examples of the material constituting the thin film waveguide include $LiNbO_3$, $LiTaO_3$, $ZnO$, $Pb(Zr, Ti)O_3$ (hereinafter, referred to as "PZT"), (Pb, La) (Zr, Ti)$O_3$ (hereinafter, referred to as "PLZT"), etc. When $LiNbO_3$ is used as the material, the thin film waveguide may be produced, for example, by depositing Ti on a single crystal $LiNbO_3$ wafer and then diffusing Ti into $LiNbO_3$ at about 1,000° C., by conducting a vapor phase epitaxial growth of an $LiNbO_3$ thin film on a single crystal $LiTaO_3$ substrate by the Rf-magnetron sputtering method, or by conducting a solid phase epitaxial growth of an $LiNbO_3$ thin film on a single crystal $\alpha$-$Al_2O_3$ substrate by the sol-gel method. When ZnO is used, the thin film waveguide may be produced, for example, by forming a c-axis orientation ZnO thin film on a glass substrate by the electron beam vapor deposition or the Rf-magnetron sputtering method. When PLZT is used, the thin film waveguide may be produced, for example, by conducting a vapor phase epitaxial growth of a PLZT thin film on an MgO substrate by the ion beam sputtering method, by conducting a vapor phase epitaxial growth of a PLZT thin film on an epitaxial MgO buffer layer on a GaAs substrate by the Rf-magnetron sputtering method, or by conducting a solid phase epitaxial growth of a PLZT thin film on an $SrTiO_3$ substrate by the sol-gel method.

Examples of lasers useful as the light source include gas lasers such as He—Ne, compound semiconductor lasers such as AlGaAs, laser arrays thereof, etc. Laser light generated by laser oscillation is introduced into the thin film waveguide by, for example, a method selected from the prism coupling method, the butt coupling (or end coupling) method, the grating coupling method and the evanescent field coupling method. Preferred examples of the thin film lens which is disposed in the thin film waveguide as required and which shapes laser beams, include a mode index lens, a Luneburg lens, a geodesic lens, a Fresnel lens, a grating lens, etc.

Figure 8:
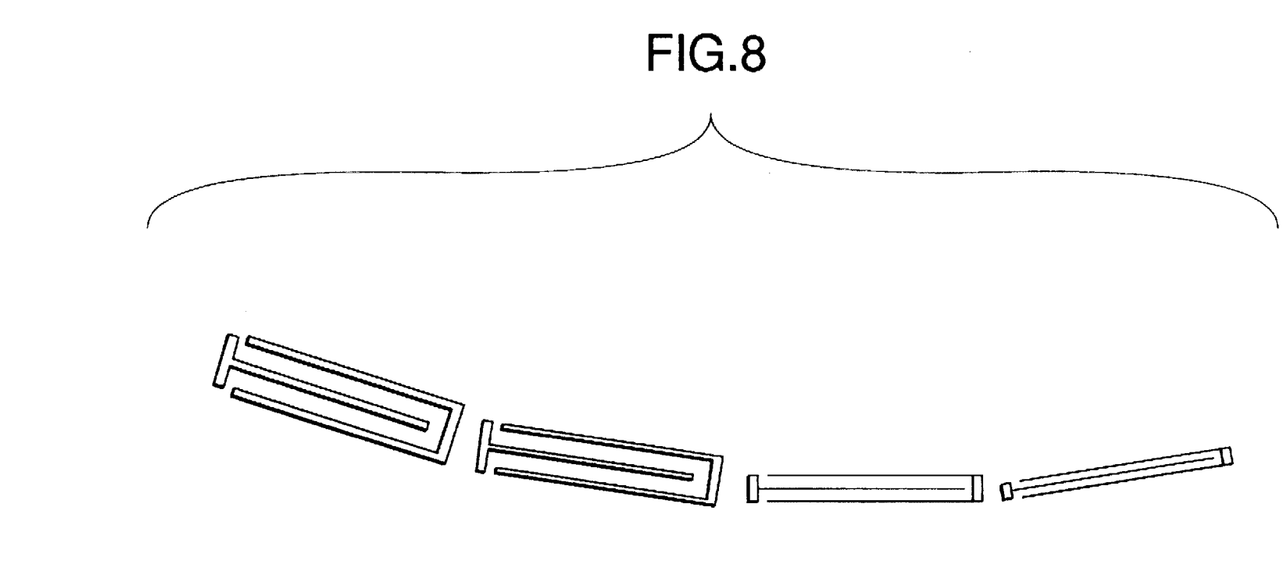
FIG. 8 is a diagram showing an electrode set of a plurality of electrodes which have different electrode finger pitches and are arranged at different angles.

In the invention, examples of the comb-like electrode for exciting a SAW for diffracting and deflecting the laser beams in the thin film waveguide, include electrodes such as a parallel comb-like electrode, a chirp electrode in which the pitch of electrode fingers is changed in the SAW propagation direction, an electrode set of a plurality of electrodes which are arranged at different angles, a chirp electrode in which angles are formed between electrode fingers, a curved interdigital electrode, a curved electrode in which the distances between electrode fingers are changed in the longitudinal direction of the electrode, and an electrode set of a plurality of electrodes which have different electrode finger pitches and are arranged at different angles (multiple tilted transducer) as shown in FIG. 8. The laser beams in the thin film waveguide may be subjected to multiple diffraction by using one of these electrodes.

The means for emitting the laser beams from the thin film waveguide may be suitably selected from end face emission, a prism coupler, a grating coupler, a focusing coupler, a SAW grating coupler, etc.

In general, an optical modulating device due to the waveguide acoustooptic (AO) effect is divided into an ultrasonic wave source and an ultrasonic wave medium. The ultrasonic wave medium is required to have physical properties in which the refractive index n (a tensor or second order) and the photoelastic coefficient e (a tensor of fourth order) are large, and the density ρ and the ultrasonic wave speed v are small. The performance index M of the medium is indicated by the following expression:

$$M=n^6e^2/\rho v^3 \qquad [1]$$

With respect to the piezoelectric effect, the electric polarization D and the strain S are indicated as functions of the electric field E and the stress T as follows:

$$D=dT+lTE \qquad [2]$$

$$S=sET+dE \qquad [3]$$

where d is the piezoelectric coefficient, sE the elastic modulus, and lT the dielectric constant.

The ultrasonic wave source functions by the piezoelectric effect utilizing the strain S with respect to the input of the electric field E. Accordingly, the ultrasonic wave source is required to have physical properties of high piezoelectric coefficient d (a tensor of third order) and high electromechanical coupling coefficient k (a tensor or third order) which represents a ratio of the energy converted into mechanical energy to the supplied electric energy.

As a thin film device, it is advantageous to use a piezoelectric material which serves an ultrasonic wave source and also as an ultrasonic wave medium. That is, a material in which the performance index M and the electromechanical coupling coefficient k are high is required. When the piezoelectric effect of a ferroelectric material is to be used, therefore, typical examples of the material of the thin film waveguide include $LiNbO_3$, $LiTaO_3$, $ZnO$, PZT, PLZT, etc. Particularly, a thin film waveguide such as that produced by conducting a vapor phase epitaxial growth of an $LiNbO_3$ thin film on a single crystal $\alpha$-$Al_2O_3$ substrate by the Rf-magnetron sputtering method is preferably used.

When the piezoelectric effect of an $LiNbO_3$ thin film is used, a surface acoustic wave (SAW) can be excited through a transducer. The SAW causes the refractive index of the thin film to be periodically changed so that laser light which is coupled into the ferroelectric thin film and crosses the SAW is subjected to the Bragg reflection due to the acoustooptic effect under the Bragg condition indicated by the following expression:

$$m\lambda = 2\Lambda \sin\theta_B \quad [4]$$

where m is the order of the diffracted laser, $\lambda$ the wavelength of the laser, $\Lambda$ the wavelength of the SAW, and $\theta_B$ the Bragg angle (angle of deflection×½).

In the acoustooptic (AO) modulation, the Bragg reflection condition is indicated also by the magnitude of Q in the following expression:

$$Q = 2\pi\lambda L/n\Lambda^2 > 1 \quad [5]$$

In expression [5] above, L is the beam width of the SAW. When Q<1, there occurs the Raman-Nath diffraction.

In this case, when the input frequency of the transducer is modulated, the wavelength $\Lambda$ of the SAW is changed so that the Bragg angle $\theta_B$ is changed, thereby allowing the laser light to be used in a scanning operation.

Figure 1:
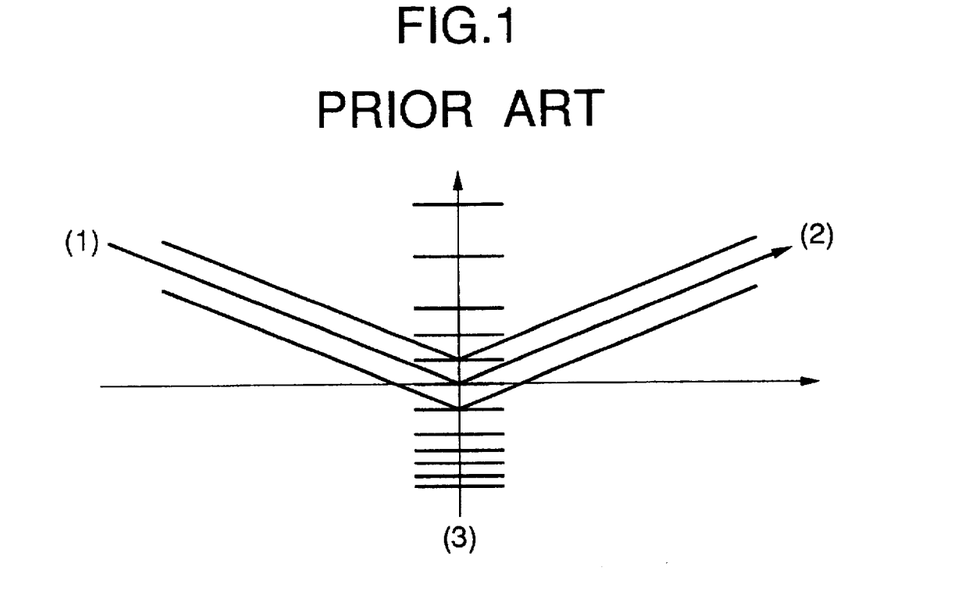
FIG. 1 is a diagram showing deflection of laser beams in accordance with prior art digital modulation.

The frequency sweep is usually conducted by digital modulation such as shown in FIG. 1. The frequency of the SAW (3) of the width crossing the collimated incident laser beams (1) is changed at an appropriate step, and that of the SAW over the laser beam width is constant.

The angle of deflection is determined in the manner described below. In a medium of the effective refractive index n, the wavelength of light has the following relationships with respect to the wavelength $\lambda_0$ of light in a vacuum:

$$\lambda = \lambda_0/n \quad [6]$$

When the frequency of the SAW is indicated by f and the speed of the SAW by v, therefore, the angle of deflection $2\theta_B$ with respect to the incident light is obtained from expression [4] as follows:

$$2\theta_B = 2\sin^{-1}(\lambda/2\Lambda) = 2\sin^{-1}(\lambda_0/2n\Lambda) \quad [7]$$
$$= 2\sin^{-1}(\lambda_0 f/2nv) = 2 \cdot \lambda_0 f/2nv$$
$$= \lambda_0 f/nv (=\lambda_0/n\Lambda) \text{ (when } \theta_B \text{ is small)}$$

From expression [7], an angle of deflection $2\Delta\theta_B$ in a frequency band $\Delta f$ of the SAW is obtained as follows:

$$2\Delta\theta_B = \lambda_0 \Delta f/nv \quad [8]$$

This angle of deflection can be increased by increasing the frequency and band of the SAW, or by suitably selecting a material in which the refractive index and the SAW speed are low. The increase of the frequency and band of the SAW may be attained by a chirp electrode in which the pitch of electrode fingers is changed in the SAW propagation direction, a chirp electrode in which angles are formed between electrode fingers, a curved interdigital electrode, a curved electrode in which the distances between electrode fingers are changed in the longitudinal direction of the electrode, or the like. In addition to the above, effective measures include: a method in which the band is driven by a plurality of transducers, with dividing it by an electrode set wherein a plurality of chirp electrodes in each of which the pitch of electrodes is changed in the SAW propagation direction are arranged at different angles, a plurality of electrodes which have different electrode pitches and are arranged at different angles, or the like; the double diffraction method; and the multiple diffraction method.

FIG. 1 shows deflection of laser beams in accordance with a prior art digital modulation method, and specifically a state where laser beams entering a thin film waveguide are deflected by a surface acoustic wave excited by digital modulation. In FIG. 1, (1) designates incident laser beams, (2) designates output laser beams, and (3) designates the center surface acoustic wave (SAW).

In the digital modulation, the spot diameter, the number of spots, and the spot moving time are determined by the following expressions. When the width of the laser beams in the thin film waveguide is indicated by D and the focal length of an imaging lens by F, the diffraction limit spot diameter $2\omega$ ($1/e^2$ diameter) is indicated by:

$$2\omega = (4/\pi) \cdot (\lambda \cdot F/D) \quad [9]$$

and the resolution laser spot number $N_d$ is indicated by the following expression:

$$N_d = 2\Delta\theta_B \cdot F/2\omega = (\pi/4) \cdot \tau \cdot \Delta f_d \quad [10]$$

$\tau$ is the passing time of the SAW with respect to the laser beam width. When the SAW is digital-modulated, the time corresponds to the spot moving time. In order to shorten the time, it is required to reduce the laser beam width or select a material in which the SAW speed is high.

When $\Delta f_d$ is the frequency band of the SAW and $\delta f_d$ ($=1/\tau$) is a frequency change required for diffraction, $N_d$ can be indicated also by the following expression:

$$N_d = \Delta f_d/\delta f_d = \tau \cdot \Delta f_d = D/v \cdot \Delta f_d \quad [11]$$

Therefore, there are the relationships in which, when the spot moving time is shortened, the spot number is reduced, and, in order to increase the spot number, the spot moving time is lengthened. In order to increase the spot number without changing the spot moving time, it is effective to widen the band of the transducer.

From $\tau$ and $N_d$, the scanning speed (time) $t_4$ is approximately expressed as follows:

$$t_d = \rho \times N_d = \tau \times \tau \cdot \Delta f_d = \tau^2 \cdot \Delta f_4 \quad [12]$$

Figure 2:
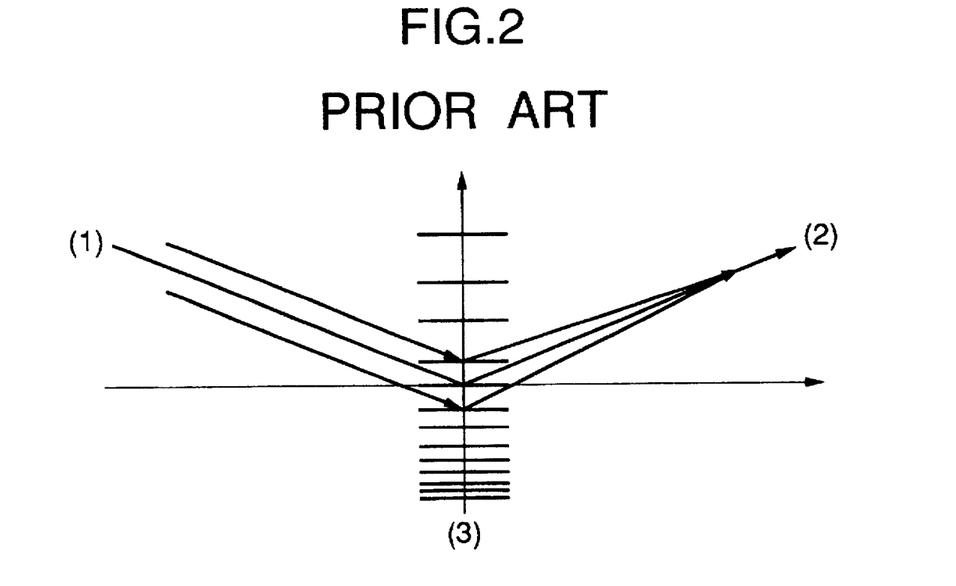
FIG. 2 is a diagram showing deflection of laser beams in accordance with prior art analog modulation.

FIG. 2 shows deflection of laser beams in accordance with a prior art analog modulation method, and specifically a state where laser beams entering a thin film waveguide are deflected by a SAW excited by analog modulation.

In the case of analog modulation in which the frequency is continuously changed, the frequency of the SAW (3) is continuously changed over the laser beam width, and hence the SAW functions as a Fresnel zone lens and the diffracted laser beams (2) are used in a scanning operation and converge or diverge. In this case, when $\delta f_a$ is the frequency band of the SAW subjected to analog modulation within the width of the laser beams, the focal length F and the spot diameter d at the focal point in the case of convergence are indicted as follows:

$$F=D\nu/(\lambda \delta f_a)=(\nu^2/\lambda)\cdot(\tau/\delta f_a) \quad [13]$$

$$d=\nu/\delta f_a \quad [14]$$

When $T_a$ is the modulation sweep time (analog modulation time width) and $\Delta f_a$ is the frequency band of the SAW subjected to analog modulation, the scanning speed $t_a$ and the resolution laser spot number $N_a$ are as follows:

$$t_a=T_a-\tau \quad [15]$$

$$N_a=(T_a-\tau)/T_a\cdot(\tau\cdot\Delta f_a) \quad [16]$$

Figure 3:
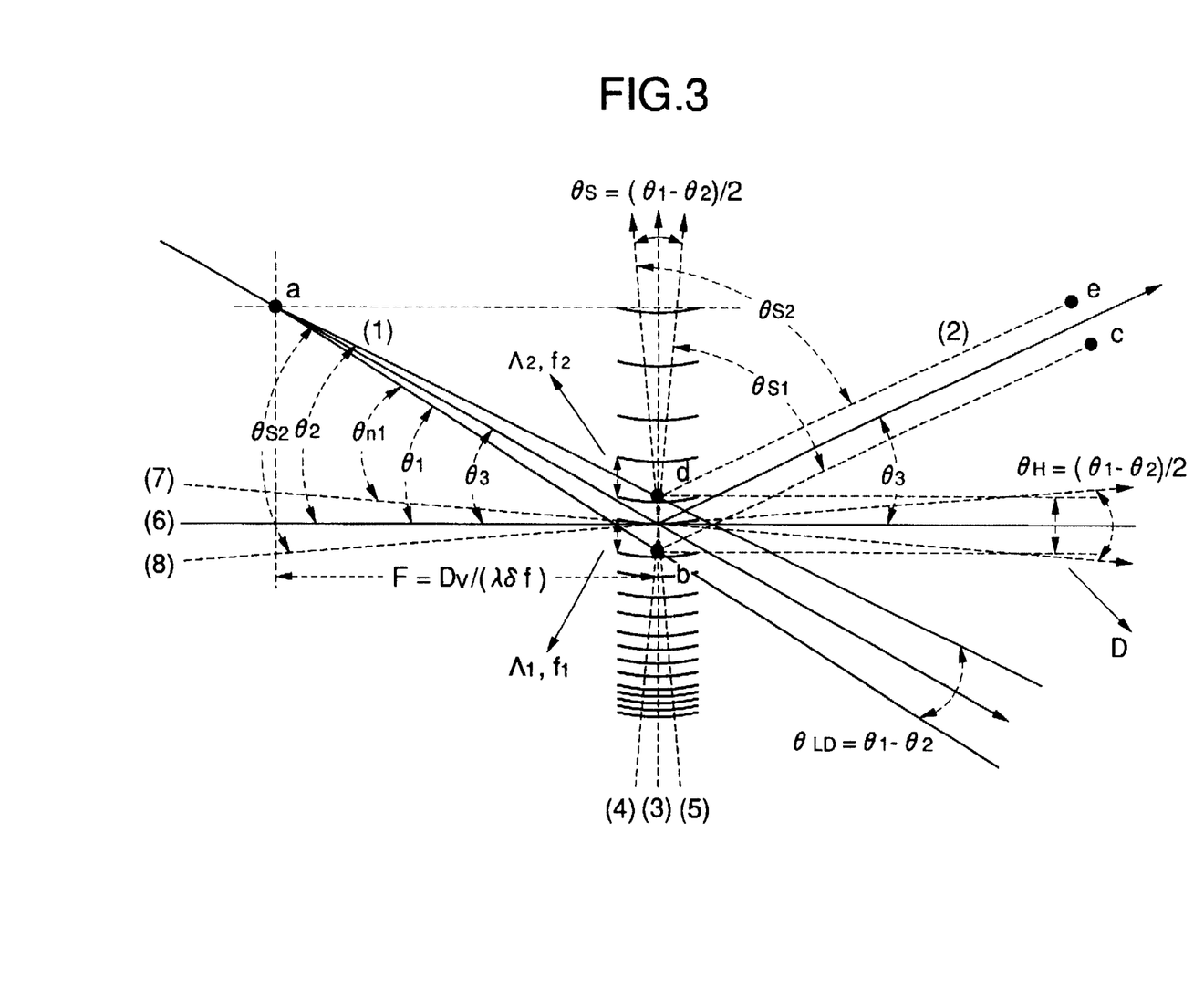
FIG. 3 is a diagram showing deflection of laser beams in accordance with analog modulation according to the present invention.

FIG. 3 is a diagram illustrating deflection of the laser beams due to the analog modulation method of the invention. In FIG. 3, the SAW is excited by a curved chirp electrode in which the distances between electrode fingers are changed in the longitudinal direction of the electrode. The laser beams (1) having a divergent angle of $\theta_{LD}$ from a light source, of which position is represented by "a" in FIG. 3, are incident on the SAW and output as parallel rays (2), thereby satisfying the Bragg condition in a wide range. The SAW in a travelling direction (4) contributes to the diffraction at point b in FIG. 3, and that in a travelling direction (5) to the diffraction at point d. When the Bragg diffraction angle formed by the center line of the laser beams and a center Bragg diffraction plane (6) due to the center SAW (3) is indicated by $\theta_3$, an angle formed by outline a–b of the incident laser beams (1) and the Bragg diffraction plane (6) due to the SAW (3) by $\theta_1$, and an angle formed by outline a–d of the incident laser beams (1) and the Bragg diffraction plane (6) due to the SAW (3) by $\theta_2$, the following expression can be obtained:

$$\theta_{LD}=\theta_1-\theta_2 \quad [17]$$

When an angle formed by outline a–b–c of the laser beams and a second Bragg diffraction plane (7) due to a second SAW (4) is indicated by $\theta_{n1}$, the minimum angle formed by outline a–d–e of the incident laser beams and a third Bragg diffraction plane (8) due to a third SAW (5) by $\theta_{n2}$, and an angle formed by the second and third Bragg diffraction planes (7) and (8) by $\theta_N$, these angles are indicated as follows:

$$\theta_H = (\theta_1-\theta_2)/2 \quad [18]$$

$$\theta_{n1} = \theta_1-(\theta_H/2)=\theta_1-(\theta_1-\theta_2)/4 \quad [19]$$

$$= \theta_1-\theta_{LD}/4=(3\theta_1+\theta_2)/4$$

$$\theta_{n2} = \theta_2+(\theta_H/2)=\theta_2+(\theta_1-\theta_2)/4 \quad [20]$$

$$= \theta_2+\theta_{LD}/4=(\theta_1+3\theta_2)/4$$

When the wavelength and frequency at point b of the analog-modulated SAW are respectively indicated by $\Lambda_1$ and $f_1$ and the wavelength and frequency at point d by $\Lambda_2$ and $f_2$, the following relationships are attained:

$$\Lambda_1=\nu/f_1,\ \Lambda_2=\nu/f_2 \quad [21]$$

$$\lambda=2\Lambda_1\sin\theta_{n1},\ \lambda=2E_s\sin\theta_{n2} \quad [22]$$

Therefore, $$\lambda/2\Lambda_1\lambda/2E_{2-\sin\theta_{n1}}-\sin\theta_{n2} \quad [23]$$

$$\lambda f_1/2\nu-\lambda f_2/2\nu=2\cos\{(\theta_{n1}\theta_{n2})/2\}\cdot\sin\{(\theta_{n1}-\theta_{n2})/2\} \quad [24]$$

Furthermore, the relationships of $\theta_{n1}=(3\theta_1+\theta_2)/4$ and $\theta_{n2}=(\theta_1+3\theta_2)/4$ are attained, and therefore $$\lambda/2\nu(f_1-f_2)=2\cos\{(4\theta_1+4\theta_2)/8\}\cdot\sin\{(2\theta_1-2\theta_2)/8\} \quad [25]$$

When $\delta f=f_1-f_2$, the frequency difference $\delta f$ between the points b and d is obtained by:

$$\lambda\delta f/2\nu=2\cos\{(\theta_1+\theta_2)/2\}\cdot\sin\{(\theta_1-\theta_2)/4\} \quad [26]$$

Furthermore, $(\theta_1+\theta_2)/2=\theta_3$ and $(\theta_1-\theta_2)/4=\theta_{LD}/4$, and therefore the following relationships are established:

$$\lambda/2\nu\cdot\delta f = 2\cos\theta_3\cdot\sin(\theta_{LD}/4) \quad [27]$$

$$\delta f = 2\nu/\lambda\cdot\{2\cos\theta_3\cdot\sin(\theta_{LD}/4)\} \quad [28]$$

$$= 2\nu n/\lambda_0\cdot\{2\cos\theta_3\cdot\sin(\theta_{LD}/4)\}$$

or $$\theta_3 = \cos^{-1}(\delta f\lambda/4\nu\cdot\sin(\theta_{LD}/4)) \quad [29]$$

$$= \cos^{-1}(\delta f\lambda_0/4\nu n\cdot\sin(\theta_{LD}/4))$$

According to the invention, in the case where the above-mentioned frequency difference $\delta f$ satisfies the condition of expression [28], even when the divergent angle $\theta_{LD}$ of the laser beams is fixed in analog modulation, the deflected laser beams can be always output as parallel rays and a frequency sweep of a waveform such as shown in FIG. 4 can be conducted. When $\lambda=780$ nm, $\nu=3,500$ m/s, and $n=2$, for example, the relationships of $\theta_{LD}$, $\theta_3$ and $\delta f$ are as follows:
when $\theta_{LD}=30°$, $\delta f=4.614$ MHZ at $\theta_3=10°$ and $\delta f=4.666$ MHZ at $\theta_3=5°$,
when $\theta_{LD}=20°$, $\delta f=3.082$ MHZ at $\theta_3=10°$ and $\delta f=3.116$ MHZ at $\theta_3=5°$,
when $\theta_{LD}=15°$, $\delta f=2.312$ MHZ at $\theta_3=10°$ and $\delta f=2.338$ MHZ at $\theta_3=5°$,
when $\theta_{LD}=10°$, $\delta f=1.542$ MHZ at $\theta_3=10°$ and $\delta f=1.560$ MHZ at $\theta_3=5°$,
when $\theta_{LD}=1°$, $\delta f=772$ MHZ at $\theta_3=10°$ and $\delta f=780$ MHZ at $\theta_3=5°$, and
when $\theta_{LD}=0.3°$, $\delta f=46.28$ MHZ at $\theta_3=10°$ and $\delta f=46.82$ MHZ at $\theta_3=5°$.

However, it is not easy to set $\Delta f_a$ to be 1,000 MHZ (1 GHz) or higher. In a practical view point, therefore, $\theta_{LD}$ is preferably set to be from more than 0° to less than 10°.

Figure 4A:
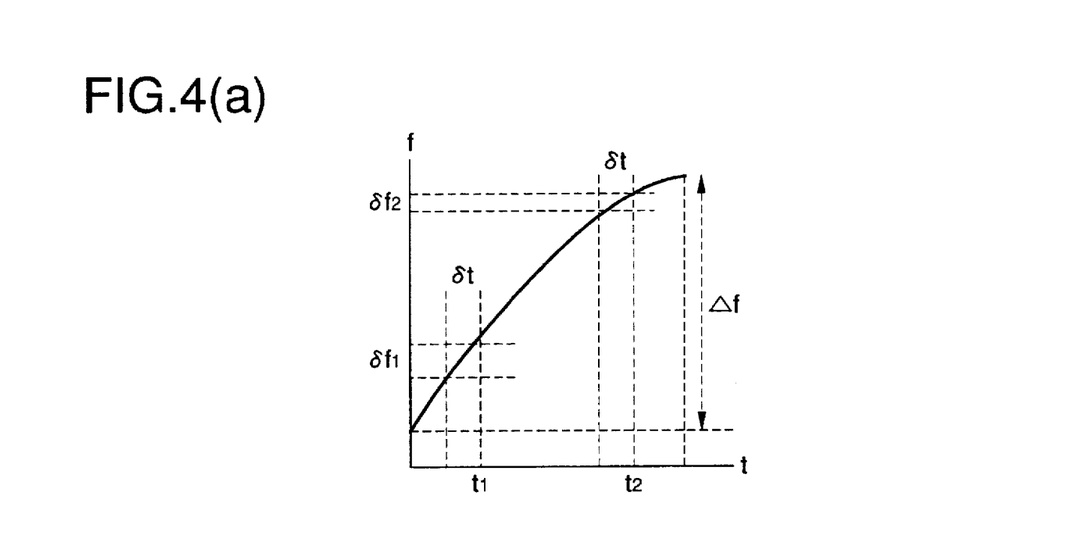
FIGS. 4(a) to (c) show waveforms of analog modulation in which frequency sweep properties are controlled according to the present invention.
Figure 4B:
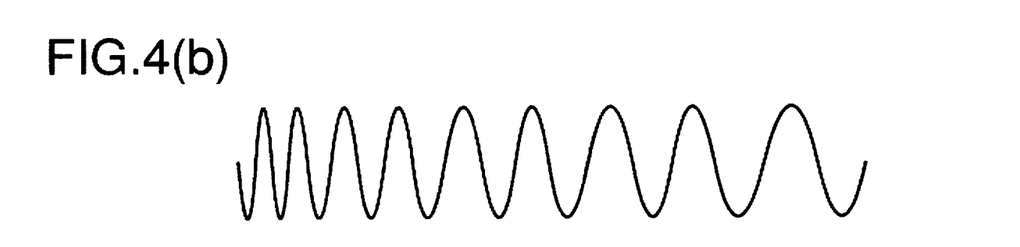
Figure 4C:
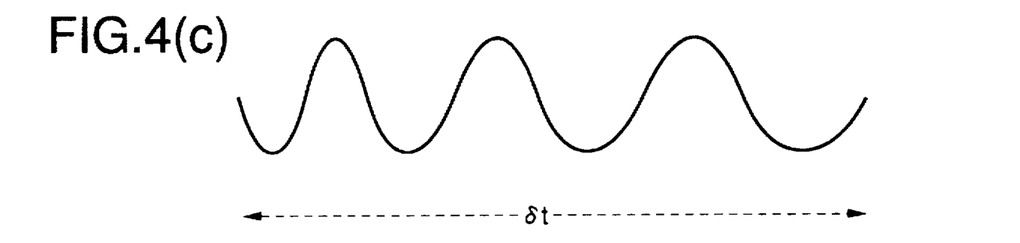

In FIG. 4(a) shows the waveform of analog modulation in which frequency sweep properties are controlled, FIG. 4(b) shows the waveform of the SAW in a band $\delta f_1$ where interference is done at $t_1$ over the laser beam width, and FIG. 4(c) shows the waveform of the SAW in the band $\delta f_2$ where interference is done at $t_2$ over the laser beam width.

The diffraction efficiency $\eta$ is approximately shown by the following expression:

$$\eta=\sin^2[\pi/4\cdot I\{M\cdot P\cdot L/(d\cdot\lambda^2)\}^{1/2}] \quad [30]$$

where I is an overlap integral of guided light and the SAW, M is the performance index of the material of the thin film waveguide, P is the power of the SAW, and L is the interaction length of the guided light and the SAW.

When the frequency of the SAW is increased and the band of the sweep frequency is widened to increase the angle of deflection or the number of resolution spots, there arises a problem in that the diffraction efficiency is lowered. In order to obtain the angle of deflection of 10° or more, for example, the frequency of the SAW is made 1 GHz or higher. This causes the absorption of the SAW to be increased, thereby lowering the diffraction efficiency. When the band of the transducer is widened in order to widen the band of the sweep frequency, the excitation efficiency of the SAW is lowered, thereby producing a problem in that the diffraction efficiency is lowered. In order to prevent these problems form occurring, the employment of a method in which the required band is divided into some portions and the divided band portions are respectively driven by several transducers, or the double diffraction method is effective.

Figure 5:
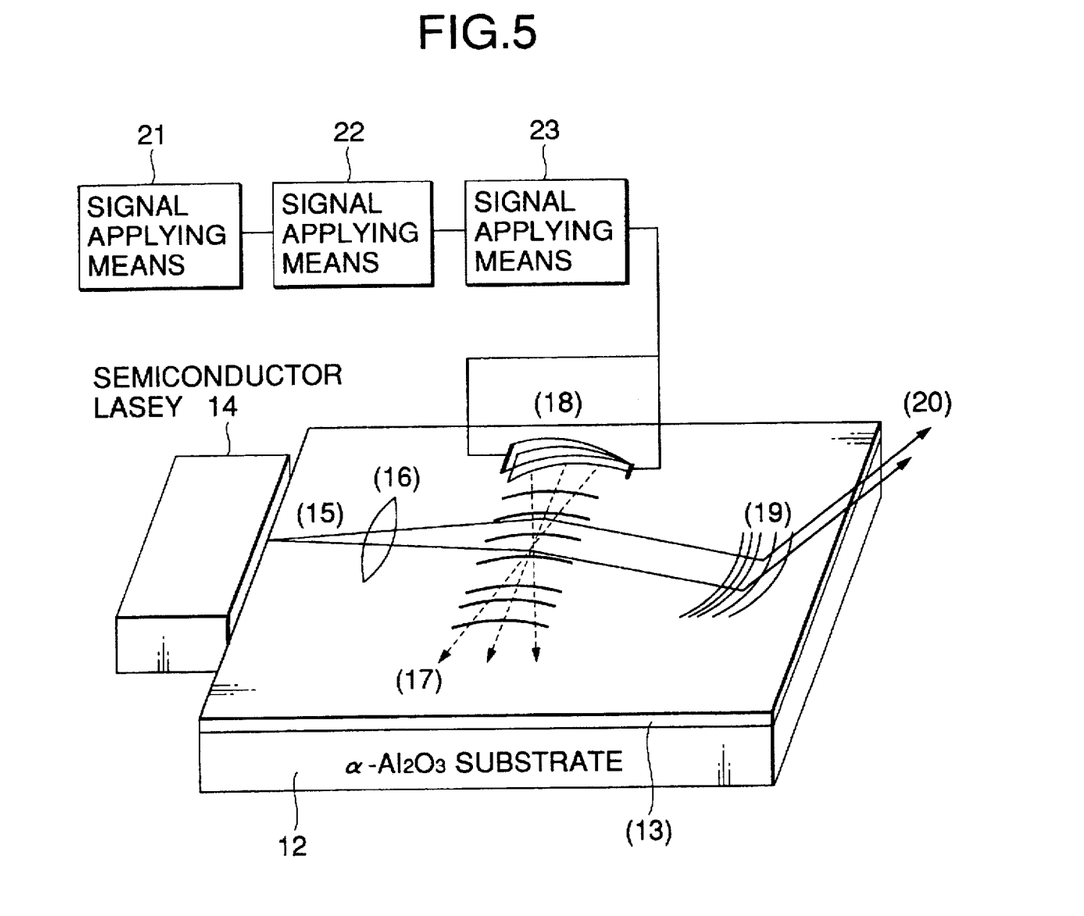
FIG. 5 is a diagram showing an embodiment of the optical scanning device according to the present invention.

FIG. 5 is a diagram showing an embodiment of the optical scanning device of the invention. In FIG. 5, (12) designates an α-Al₂O₃ substrate, (13) designates an LiNbO₃ thin film waveguide, (14) designates a semiconductor laser, (15) designates incident laser beams, (16) designates a mode index lens, (17) designates a surface acoustic wave, (18) designates a chirp electrode, (19) designates a grating, and (20) designates output laser beams.

The incident laser beams (15) from a light source comprised of the semiconductor laser (14) are introduced to enter the LiNbO₃ thin film waveguide by coupling means which gives a constant divergent angle thereto. The angles of the laser beams are corrected by the mode index lens (16) which is disposed in the thin film waveguide.

The corrected laser beams are then excited by the chirp electrode (18) and deflected by the SAW of analog modulation in which a frequency sweep signal control of a continuously changing frequency is conducted, thereby forming parallel rays.

In FIG. 5, (21) to (23) show means for supplying a signal for exciting a surface acoustic wave which continuously sweeps a high frequency range containing a frequency range in the interference range with the laser beam in accordance with an angle of diffraction of the laser beam. Specifically, (21) designates a control circuit, (22) designates a sweeper, and (23) designates a high-frequency amplifier.

In the curved chirp electrode, the distances between electrode fingers win the longitudinal direction of the electrode are changed in the SAW propagation direction.

The deflected laser beams are output by the grating (19) from the thin film waveguide, as the parallel output laser beams (20).

Figure 6:
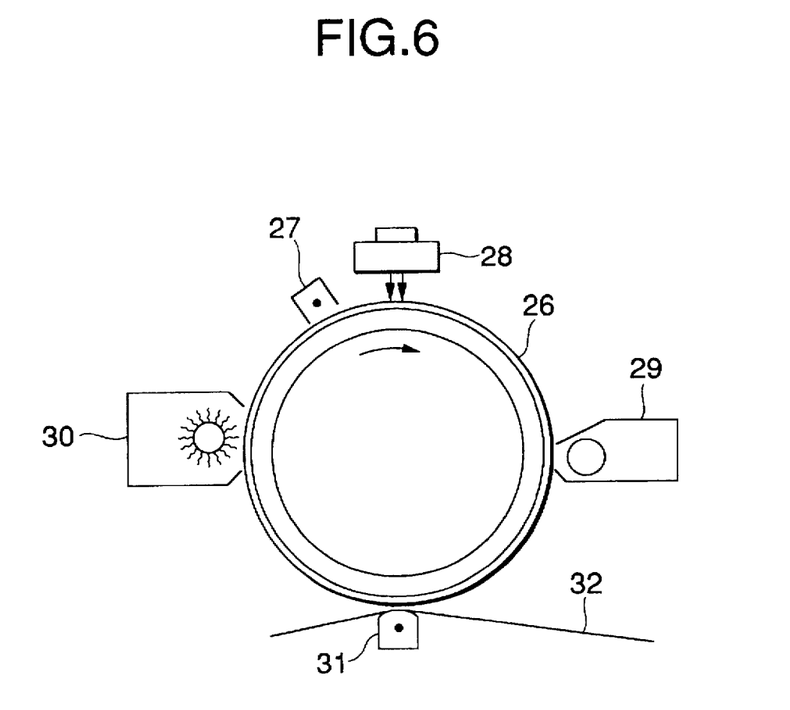
FIG. 6 is a diagram showing an embodiment of the image forming apparatus of the present invention.

FIG. 6 is a diagram showing an embodiment of the image forming apparatus of the invention. The image forming apparatus comprises a photoreceptor (26), charging means (27) for uniformly charging the photoreceptor, exposure means (28) for irradiating the photoreceptor with light to form a latent image, and developing means (29) for visualizing the latent image. The exposure means is an optical scanning device comprising: a thin film waveguide; means for coupling a laser beam to the thin film waveguide, the laser beam being emitted from a light source and having a constant divergent angle; and a comb-like electrode for exciting a surface acoustic wave which is a high-frequency sweep signal that is used for deflecting the laser beam, thereby allowing the laser beam to be output as parallel rays. In the figure, (30) designates a cleaner, (31) designates a transfer device, and (32) designates a transfer sheet.

The present invention will be described in more detail with reference to the following Embodiments, but the invention should not be construed as being limited thereto.

EMBODIMENT 1

As shown in FIG. 5, a thin film waveguide is used which is formed on the α-Al₂O₃ substrate (12) and which is made of LiNbO₃. The semiconductor laser (14) is directly fixed to an end face of the thin film waveguide so as to conduct the butt coupling.

The divergent angle of the incident laser beams (15) is corrected by the mode index lens (16) so as to be 0.3°. At the position where the semiconductor laser beams have a width (D) of 16 mm in the portion interfering with the SAW, the laser beams are then deflected by analog modulation in which the frequency is continuously changed, by the curved chirp electrode (18) in which the distances between electrode fingers in the longitudinal direction of the electrode are changed in the SAW propagation direction (17). The analog modulation is controlled in accordance with a frequency sweep signal which satisfies the condition of expression [28] and which has a waveform such as shown in FIG. 4.

Specifically, the frequency is continuously swept, and also the frequency range within the interference range with the laser beams is swept in accordance with an angle of diffraction of the laser beams, so that, for example, when the angle of diffraction of the laser beams is 5°, δf=46.82 MHZ, and, when the angle is 10°, δf=46.28 MHZ.

Thereafter, the deflected laser beams are output by the grating (19) to the outside of the thin film waveguide, as parallel beams, and then used through an optical system such as an Fθ lens, for conducting the laser scanning exposure on a photoreceptor.

The optical scanning device had the following performance. The divergent angle $\theta_{LD}$ of the incident semiconductor laser beams was 0.3°. When the modulation sweep time T=88 μs, the modulation band Δf=780 MHZ, and the laser wavelength λ₀780 nm, the scanning speed t was 83 μs/line. The photoreceptor was exposed to light under these conditions. When the process speed of the photoreceptor was 250 mm/s, printing at 1,200 dots/inch could be conducted on 60 sheets of A4-size paper per one minute. When the process speed of the photoreceptor was 500 mm/s, printing at 600 dots/inch could be conducted on 110 sheets of A4-size paper per one minute. Namely, very high speed printing was realized.

Comparative Embodiment 1

In the same manner as in Embodiment 1, a thin film waveguide made of LiNbO₃ is used, and a semiconductor laser is directly fixed to an end face of the LiNbO₃ thin film waveguide so as to conduct coupling. The incident semiconductor laser beams are collimated to have a laser beam width (D) of 16 mm by a geodesic lens and then subjected to deflection due to digital modulation by a curved chirp electrode in which the distances between electrode fingers are changed in the SAW propagation direction. The deflected laser beams are output by a grating to the outside of the thin film waveguide, and then used through an optical system such as an Fθ lens, for conducting the laser scanning exposure on a photoreceptor.

The optical scanning device had the following performance. When the band Δf of the transducer was 780 MHZ, and the laser wavelength λ₀=780 nm, the scanning speed t was about 16.3 ms/line. When the photoreceptor was exposed to light under these conditions, printing could be conducted at the most on one sheet of A4-size paper per one minute. Such a low printing speed could not be practically used.

Comparative Embodiment 2

In the same manner as in Embodiment 1, a thin film waveguide made of LiNbO₃ is used, and a semiconductor laser is directly fixed to an end face of the LiNbO₃ thin film waveguide so as to conduct coupling. The incident semiconductor laser beams are collimated by a geodesic lens and then subjected to deflection due to analog modulation by a chirp electrode in which the pitch of electrode fingers is changed in the SAW propagation direction, without conducting the sweep signal control of the frequency. The deflected laser beams are output by a grating to the outside of the thin film waveguide, and then used through an optical system such as an Fθ lens, for conducting the laser scanning exposure on a photoreceptor.

The optical scanning device had the following performance. The divergent angle $\theta_{LD}$ of the incident semiconductor laser beams was 0. When the modulation sweep time T=88 μs, the modulation band Δf=780 MHZ, and the laser wavelength $\lambda_0$=780 nm, the scanning speed t was 83 μs/line. When the photoreceptor was exposed to light under these conditions, however, the deflected laser beams were converged at a focal length of about 150 cm and hence it was impossible to conduct uniform exposure on the photoreceptor.

EMBODIMENT 2

Figure 7:
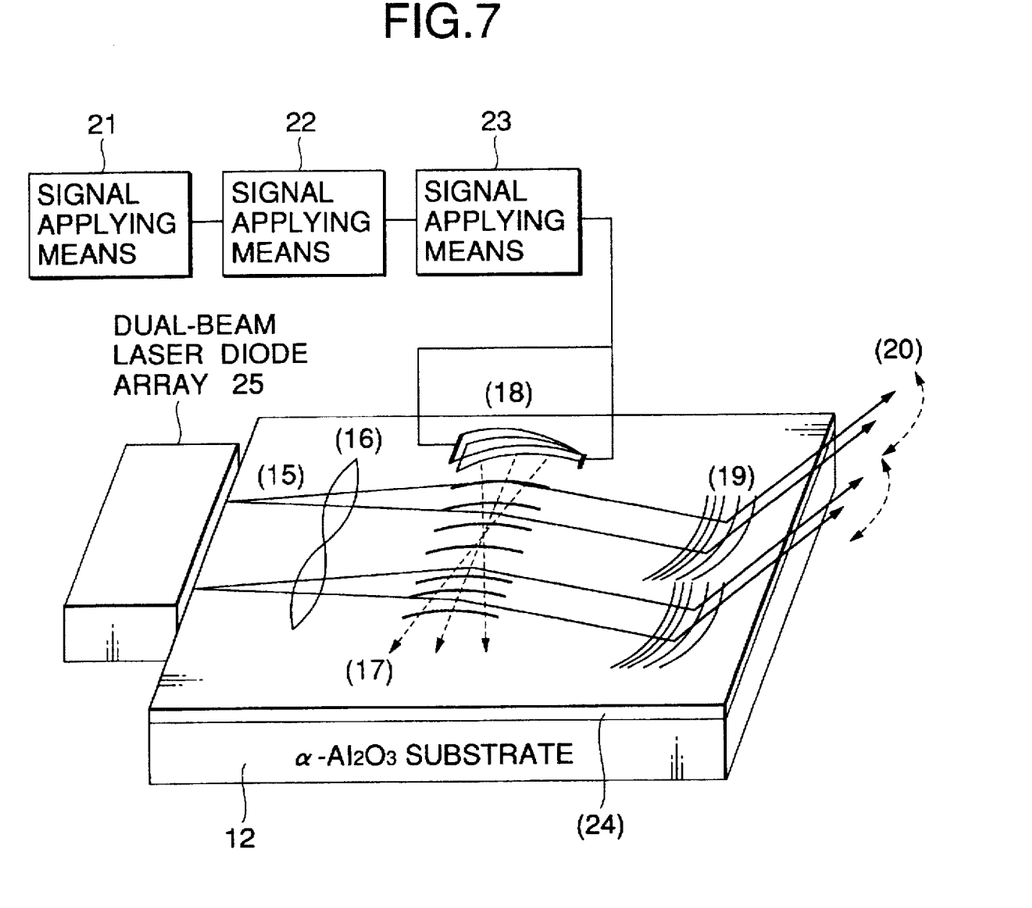
FIG. 7 is a diagram showing the optical scanning device used in Example 2 or the present invention.

An optical scanning device a shown in FIG. 7 is used, in which a thin film ZnO waveguide (24) is formed on a single crystal $\alpha\text{-}Al_2O_3$ substrate, and a dual-beam laser diode array (25) is directly fixed to an end face of the thin film waveguide so as to conduct the coupling.

The incident semiconductor laser beams are subjected as they are to deflection due to analog modulation in which the frequency sweep signal control is conducted in the same manner as in Embodiment 1, by a chirp electrode in which the pitch of electrode fingers is changed in the SAW propagation direction. The deflected laser beams are output by a grating and then used through an optical system such as a lens, for conducting the exposure on a photoreceptor. The laser scanning of the photoreceptor is conducted by the interlaced scanning operation for every two lines in the subscanning direction (rotational direction) of the photosensitive drum.

EMBODIMENT 3

A thin film waveguide which is produced by diffusing Ti into a single crystal substrate of $LiNbO_3$ is used. Semiconductor laser beams which are emitted from a 4-beam laser diode array and in which the divergent angle is corrected are introduced into the thin film waveguide through a prism coupling. The incident semiconductor laser beams are deflected by analog modulation in which the frequency sweep signal control is conducted in the same manner as in Embodiment 1, by a chirp electrode in which the pitch of electrode fingers is changed in the SAW propagation direction. The deflected laser beams are output by a prism for emitting laser beams to the outside of the thin film waveguide, and then used through an optical system such as a lens, for exposing a photoreceptor with light. The laser scanning of the photoreceptor is conducted by the simultaneous scanning operation for four lines in the subscanning direction (rotational direction) of the photosensitive drum.

EMBODIMENT 4

A think film waveguide which is produced by diffusing Ti into a single crystal substrate of $LiNbO_3$ is used. Semiconductor laser beams which are emitted from two semiconductor lasers are introduced into the thin film waveguide through a prism coupling. The incident semiconductor laser beams are deflected by analog modulation in which the frequency sweep signal control is conducted in the same manner as in Embodiment 1, by a chirp electrode in which the pitch of electrode fingers is changed in the SAW propagation direction. The deflected laser beams are output by a prism for emitting laser beams to the outside of the thin film waveguide, and then used through an optical system such as a lens, for exposing a photoreceptor with light. The laser scanning of the photoreceptor is conducted by the simultaneous scanning operation for two lines in the subscanning direction (rotational direction) of the photosensitive drum.

EMBODIMENT 5

A thin film waveguide is used which is made of epitaxial PZT grown through an epitaxial MgO buffer layer on a dual-beam laser diode array. The semiconductor laser is produced by growing a multilayer structure of AlGaAs by the MOCVD method and diffusing Si into a portion which does not function as the laser cavity. The MgO layer is grown by the electron beam vapor deposition method, and the PZT layer by the Rf sputtering method. The semiconductor laser and the optical scanning device are integrated on the same substrate. The embodiment has a structure in which the thin film waveguide of the laser unit and the PZT think film waveguide are arranged in series and the laser beams generated by the oscillation of the semiconductor laser are introduced into the PZT thin film waveguide. The incident laser beams are subjected as they are to deflection due to analog modulation in which the frequency sweep signal control is conducted in the same manner as in Embodiment 1, by a chirp electrode in which the pitch of electrode fingers is changed in the SAW propagation direction. The deflected laser beams are output by a grating and then used through an optical system such as a lens, for conducting the exposure on a photoreceptor. The laser scanning is conducted by the simultaneous scanning operation for two liens in the subscanning direction (rotational direction) of the photosensitive drum.

According to the invention, in a small optical scanning device of the thin film waveguide type which is quiet and excellent in reliability and uses the acoustooptic effect, it is possible to overcome the speed limitation imposed in optical deflection due to digital modulation, thereby allowing laser beams to be used in a high-speed scanning operation. Furthermore, the laser beam width is prevented from converging or diverging after optical deflection due to analog modulation is conducted, so that parallel rays of a high speed are obtained. According to the optical scanning method of the invention, the use of the optical scanning device enables the scanning operation to be conducted at a high speed. When the optical scanning device is use din the exposure of a photoreceptor in an image forming apparatus, the durability of the apparatus, etc. can be improved and very high speed printing can be realized. Therefore, the optical scanning device of the invention can be used in a laser beam printer, a digital copier, a facsimile apparatus, or the like ranging from a high speed one to a low speed one.

While the invention has been described in detail and with reference to specific embodiments thereof, it will be apparent to one skilled in the art that various changes and modifications can be made therein without departing from the spirit and scope thereof.

What is claimed is:

1. An optical scanning device comprising:
    a light source for emitting a laser beam having a constant divergent angle;
    a thin film waveguide;
    means for coupling the laser beam to said thin film waveguide; and
    a comb-like electrode for exciting a surface acoustic wave of a high frequency sweep signal so that the laser beam is deflected to be output as parallel rays.

2. The optical scanning device according to claim 1, wherein the constant divergent angle is from more than 0° to less than 10°.

3. The optical scanning device according to claim 1, wherein said light source comprises a plurality of lasers, or comprises a laser array which oscillates a plurality of laser beams.

4. The optical scanning device according to claim 1, wherein said device further comprises means for shaping the laser beam transmitted from said laser beam coupling means.

5. The optical scanning device according to claim 1, wherein said device further comprises means for emitting the laser beam that is deflected and output as parallel rays, to an outside of said thin film waveguide.

6. An optical scanning method comprising the steps of:

coupling a laser beam having a constant divergent angle, which is emitted from a light source, into a thin film waveguide; and exciting a surface acoustic wave of a high-frequency sweep signal by a comb-like electrode so that the laser beam is deflected by analog modulation in which frequency continuously changes, thereby outputting the laser beam as parallel rays to be used in a scanning operation.

7. The optical scanning method according to claim 6, wherein the surface acoustic wave satisfies a condition indicated by the following expressions:

$$\delta f = 2v/\lambda \cdot \{2\cos\theta_3 \cdot \sin(\theta_{LD}/4)\}$$

$$\delta f = 2vn/\lambda_0 \cdot \{2\cos\theta_3 \cdot \sin(\theta_{LD}/4)\}$$

wherein $\delta f = f_1 - f_2$ ($f_1$ is a frequency at one point of an analog-modulated surface acoustic wave and $f_2$ is a frequency at an adjacent point to said one point), $\lambda$ is a wavelength of the laser beam, $\lambda_0$ is a wavelength of light in vacuum, $v$ is a speed of the surface acoustic wave, $n$ is the index of refraction, $\theta_3$ is the Bragg angle formed by the center lien of the laser beam and the center Bragg diffraction plane due to the center surface acoustic wave, and $\theta_{LD} = \theta_1 - \theta_2$ ($\theta_1$ is an angle formed by a line running from the light source to one point on an outline of the incident laser beam and a Bragg diffraction plane due to the surface acoustic wave, and $\theta_2$ is an angle formed by a line running from the light source to one point on another outline of the incident laser beam and the Bragg diffraction plane due to the surface acoustic wave.

8. An image forming apparatus comprising:

a photoreceptor;

charging means for uniformly charging said photoreceptor;

exposing means for irradiating said photoreceptor with light to form a latent image; and developing means for visualizing the latent image, wherein said exposing means is an optical scanning device comprising: a light source for emitting a laser beam having a constant divergent angle; a thin film waveguide; means for coupling said laser beam to said thin film waveguide; and a comb-like electrode for exciting a surface acoustic wave of a high-frequency sweep signal so that the laser beam is deflected to be output as parallel rays.

9. The image forming apparatus according to claim 8, wherein the constant divergent angle is from more than 0° to less than 10°.

10. The image forming apparatus according to claim 9, wherein said light source comprises a plurality of lasers, or comprises a laser array which oscillates a plurality of laser beams.

11. The image forming apparatus according to claim 8, wherein said comb-like electrode is connected to means for supplying a signal for exciting a surface acoustic wave which continuously sweeps a high frequency range containing a frequency range in the interference range with the laser beam in accordance with an angel of diffraction of the laser beam.

12. The image forming apparatus according to claim 11, wherein the surface acoustic wave satisfies a condition indicated by the following expressions:

$$\delta f = 2v/\lambda \cdot \{2\cos\theta_3 \cdot \sin(\theta_{LD}/4)\}$$

$$\delta f = 2vn/\lambda_0 \cdot \{2\cos\theta_3 \cdot \sin(\theta_{LD}/4)\}$$

wherein $\delta f = f_1 - f_2$ ($f_1$ is a frequency at one point of an analog-modulated surface acoustic wave and $f_2$ is a frequency at an adjacent point to said one point), $\lambda$ is a wavelength of the laser beam, $\lambda_0$ is a wavelength of light in vacuum, $v$ is a speed of the surface acoustic wave, $n$ is the index of refraction, $\theta_3$ is the Bragg angle formed by the center line of the laser beam and the center Bragg diffraction plane due to the center surface acoustic wave, and $\theta_{LD} = \theta_1 - \theta_2$ ($\theta_1$ is an angle formed by a line running from the light source to one point on an outline of the incident laser beam and a Bragg diffraction plane due to the surface acoustic wave, and $\theta_2$ is an angle formed by a line running from the light source to one point on another outline of the incident laser beam and the Bragg diffraction plane due to the surface acoustic wave.

\* \* \* \* \*